(12) United States Patent
Gupta et al.

(10) Patent No.: US 12,348,803 B2
(45) Date of Patent: Jul. 1, 2025

(54) SYSTEMS AND METHODS TO TEMPORARILY GRANT ACCESS TO A DIGITAL GATEWAY

(71) Applicant: Adeia Guides Inc., San Jose, CA (US)

(72) Inventors: Vaibhav Gupta, Bangalore (IN); Ashish Gupta, Bangalore (IN); Senthil Kumar Karuppasamy, Bangalore (IN); Rohit Dhiman, Haridwar (IN)

(73) Assignee: Adeia Guides Inc., San Jose, CA (US)

( * ) Notice: Subject to any disclaimer, the term of this patent is extended or adjusted under 35 U.S.C. 154(b) by 31 days.

(21) Appl. No.: 18/098,494

(22) Filed: Jan. 18, 2023

(65) Prior Publication Data
US 2023/0156254 A1    May 18, 2023

Related U.S. Application Data (63) Continuation of application No. 17/165,299, filed on Feb. 2, 2021, now Pat. No. 11,589,096.

(51) Int. Cl.
*H04N 21/258* (2011.01)
*H04N 21/239* (2011.01)
*H04N 21/4788* (2011.01)

(52) U.S. Cl.
CPC ... *H04N 21/25875* (2013.01); *H04N 21/2396* (2013.01); *H04N 21/25816* (2013.01); *H04N 21/4788* (2013.01)

(58) Field of Classification Search
CPC ......... H04N 21/8456; H04N 21/47217; H04N 21/23418; H04N 21/2668; H04N 21/4788; H04N 21/43615; H04N 21/4622
See application file for complete search history.

(56) References Cited

U.S. PATENT DOCUMENTS

| | | | |
|---|---|---|---|
| 5,400,402 A * | 3/1995 | Garfinkle | H04N 21/4623 380/231 |
| 10,089,801 B1 | 10/2018 | Musabeyoglu et al. | |
| 10,162,956 B1 * | 12/2018 | Truong | G06Q 10/10 |
| 10,270,753 B2 | 4/2019 | Khylkouskaya et al. | |
| 10,862,825 B1 | 12/2020 | Gammel et al. | |
| 11,048,809 B1 | 6/2021 | Sun et al. | |
| 11,589,096 B2 * | 2/2023 | Gupta | G06F 21/33 |
| 2002/0067685 A1 * | 6/2002 | Bae | G11B 5/54 |
| 2012/0054847 A1 * | 3/2012 | Schultz | H04L 9/3213 726/9 |
| 2013/0051755 A1 * | 2/2013 | Brown | H04N 21/25875 386/E9.011 |
| 2013/0125212 A1 | 5/2013 | Lee | |
| 2014/0165156 A1 | 6/2014 | Fushman et al. | |
| 2015/0295930 A1 | 10/2015 | Dixon et al. | |
| 2016/0352751 A1 | 12/2016 | Perrufel et al. | |
| 2018/0006982 A1 | 1/2018 | Costello et al. | |
| 2020/0059468 A1 | 2/2020 | Wolosewicz | |
| 2020/0265842 A1 | 8/2020 | Singh | |
| 2021/0360311 A1 | 11/2021 | Richardson et al. | |

* cited by examiner

*Primary Examiner* — Jason Salce
(74) *Attorney, Agent, or Firm* — HALEY GUILIANO LLP (57) ABSTRACT

Systems and methods are provided for temporarily granting access to a digital gateway. One example method includes receiving a request for temporary access to the digital gateway. A temporary access token is generated at a server. The temporary access token is assigned to a user. Access to the digital gateway is granted via the temporary access token. The temporary access token is automatically expired after a pre-set period. Access to the digital gateway is revoked once the temporary access token has expired.

20 Claims, 7 Drawing Sheets

SYSTEMS AND METHODS TO TEMPORARILY GRANT ACCESS TO A DIGITAL GATEWAY

CROSS-REFERENCE TO RELATED APPLICATIONS

This application is a continuation of U.S. patent application Ser. No. 17/165,299, filed Feb. 2, 2021, which is hereby incorporated by reference herein in its entirety.

BACKGROUND

The disclosure relates to temporarily granting access to a digital gateway and, in particular, systems and related methods for temporarily granting access to an over-the-top content platform to a user other than the account holder of the over-the-top content platform.

SUMMARY

With the proliferation of over-the-top content platforms, there has been an increase in the number of people who wish to share their access to an over-the-top content platform. However, an account holder may wish to only temporarily share their access to an over-the-top content platform with another user, for example, to enable the user to finish watching a program on the over-the-top content platform. However, if the account holder shares their login details to the over-the-top content platform with the user, then they will have to reset their login details in order to revoke access from the user. If the account holder has multiple devices (for example, a mobile device, a tablet, a laptop and a smart TV) logged into the over-the-top content platform, it is inconvenient to have to change the login details on all of the devices following a reset of their login details in order to revoke access from the aforementioned user. Although the above example describes an over-the-top content platform, similar issues exist with any digital gateway, such as electronic locks on hotel room doors. In a similar manner, a person staying in a hotel room may require access for only a limited amount of time, and it would not be desirable for the person to be given indefinite access to a hotel room.

In view of the foregoing, it would be beneficial to have a system that allows temporary access to a digital gateway, such as an over-the-top content platform.

Systems and methods are described herein for temporarily granting access to a digital gateway, such as an over-the-top content platform. In accordance with an aspect of the disclosure, a method is provided for temporarily granting access to a digital gateway. The method incudes receiving a request for temporary access to the digital gateway. A temporary access token is generated at a server. The temporary access token is assigned to a user. Access to the digital gateway is granted via the temporary access token. The access token automatically expires after a pre-set period. Once the temporary access token has expired, access to the digital gateway is revoked. In another aspect, the digital gateway may be an over-the-top content platform.

The request may be generated at a computing device not associated with the over-the-top content platform and the temporary access token is sent from the server, via a network, to the computing device. For example, a user may start watching a program on an account holder's smart TV but does not have time to finish watching it. The user may wish to obtain temporary access to the over-the-top content platform on their smartphone in order to finish watching the program at a later time. The user may initiate the request on their smartphone. In this example, the smartphone sends the request to a server via the internet and receives a temporary access token which enables the smartphone to temporarily access the over-the-top content platform.

When a user requests temporary access to the over-the-top content platform, in response to receiving the request, the user's identity may be verified before the temporary access token is assigned to the user. For example, the user may log in to the over-the-top platform with a username and password. In another example, the user may provide a biometric confirmation of identity such a fingerprint or facial recognition. User location information may also be used to verify the user's identity.

The pre-set period may be one of a time period, a content access duration and/or a content access count. For example, a time period may be one hour, two days, a week, a month or any other time period. The time period may also be for the duration of a festival, for example, Diwali, Easter and/or Ramadan. A content access duration may include watching content for a set period of time. For example, a user may be able to watch five hours of content before the user's access is revoked. A content access count may include, for example, a fixed number of episodes of a series and/or a fixed number of movies. The content access count may be more specific, for example limited to watching specific movie(s) and/or episode(s), before a user's access is revoked.

The request for temporary access to the over-the-top platform may be initiated in any way known in the art. For example, a user may initiate the request by providing a password at an app or a website. An account holder of the over-the-top platform may be able to access a website associated with the over-the-top content platform and may be able to input a temporary password, and optionally a username, that another user can use to gain temporary access to the over-the-top platform. This temporary password may be separate from the password used by the account holder to access the over-the-top platform. This temporary password may, in some embodiments, be used with the same username used by the account holder. In another example, a user may initiate the request by providing a code at an app or a website. This code may, for example, be generated at a website of an over-the-top content platform. The user may access a website or an app on a device that is not associated with the over-the-top content platform and may enter the code in order to gain temporary access to the over-the-top platform.

In another example, an account holder may be able to generate a unique link in an app associated with the over-the-top content platform. The account holder may send this link to the user who wishes to temporarily access the over-the-top platform. When the user clicks the link, for example on their mobile phone, the user may receive a temporary access token that enables the user to temporarily access the over-the-top content platform.

In another embodiment, the request may be initiated via a communication between a computing device associated with the account holder and a computing device associated with the user. For example, an account holder may indicate via an app on their mobile phone that they would like to give another person (a "user") temporary access to the over-the-top platform. The user may open a corresponding app on their mobile phone and the user's identity may be verified via Near-Field-Communication (NFC) and/or Bluetooth communication between the mobile phone of the account holder and a mobile phone of the user. Once the user has been identified via Near-Field-Communication and/or Bluetooth communication between the two devices, the server may generate a temporary access token and send it to the user's device, so that the user can temporarily access the over-the-top content platform on their own device. An advantage of such an arrangement is ease of use. For example, two friends may be watching a movie on a smart TV but not have time to finish the movie. The account holder may initiate the request the allow the other friend to temporarily access their account by holding their mobile device to the friend's mobile device. The friend does not need to remember or note down any codes.

In a further embodiment, a user may initiate the request by scanning a Quick Response (QR) code, for example, with a camera of a mobile device. The QR code may link to a website through which a user can temporarily access the over-the-top content platform. In an example, a promoter of a TV series may distribute QR codes that enable users to temporarily access an over-the-top platform and watch the first few episodes of the series.

The over-the-top content platform may further comprise a chatroom. The chatroom may enable people who are viewing content to talk to one another via speech and/or text. When a user is granted temporary access to the over-the-top content platform, they may also be granted temporary access to a chatroom. When a user accesses the over-the-top platform via the temporary access token, the user's computing device may automatically be put in the same chatroom as a computing device of the account holder, if the user and the account holder are viewing content at the same time.

A user who accesses an over-the-top content platform may be granted access to only a subset of available content on the over-the-top content platform. For example, the user may be able to view only standard and high definition content, but not ultra-high definition content. In another example, the user may not be able to access adult and/or pay-per-view content. In a further example, the user may be able to access only series and live TV, but not movies. These limitations may be set by the account holder via a website or a settings section of an app. Additionally and/or alternatively, these limitations may be set by the over-the-top content provider.

The request may comprise receiving, from a first user, a command at a smart speaker, wherein the command comprises a request to enable a second user to temporarily access to an over-the-top platform to which the first user is subscribed. The smart speaker may communicate the request to a server, the communication comprising contact information about the second user. Assigning the temporary access token to a user may further comprise assigning the temporary access token to the second user via the contact information. For example, an account holder may issue a command to a smart speaker by saying "Give Alice temporary access to my account." The smart speaker may look up contact information about the second user. This contact information may be obtained, for example, at the smart speaker; at a device connected to the smart speaker, such as a smartphone connected via Bluetooth; and/or from a server remote to the smart speaker. The smart speaker may send the request to a server. A temporary access token may be generated at the server and sent, using the contact information, to Alice's smartphone.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which.

DETAILED DESCRIPTION

Systems and methods are described herein for temporarily granting access to an over-the-top content platform. As referred to herein, an over-the-top content platform is a service that enables users to access content via the internet. The content may be streamed live and/or streamed on demand to a computing device. On-demand content may also be downloaded to a computing device in response to a user request and/or according to a pre-set rule. Content includes audio, video and/or any other media content that may be delivered over the internet. Audio includes audio only content, such as songs. Video includes audiovisual content such as movies and/or television programs. Other media content includes e-books. The over-the-top content platform may be accessed via a website and/or an app running on a computing device.

Generally, a token is a generated code that grants a computing device access to a specific resource. An example of such a token is a JSON web token. A JSON web token comprises a header, a payload and a signature. The header comprises metadata that may include the type of token and the hashing algorithm being used to sign the token. The payload includes the claims (data) that the token is encoding, for example the issuer of the token and the expiry date/time of the token. The signature is used to verify the token and may be a hash of the header, the payload and a secret. The JSON token may be in the format of three strings separated by ".", for example, "A3jC9x.na8Ss1.POak65". The token may be used, for example, in a URL, a POST request added as header and/or as a GET request added as an appended parameter.

The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
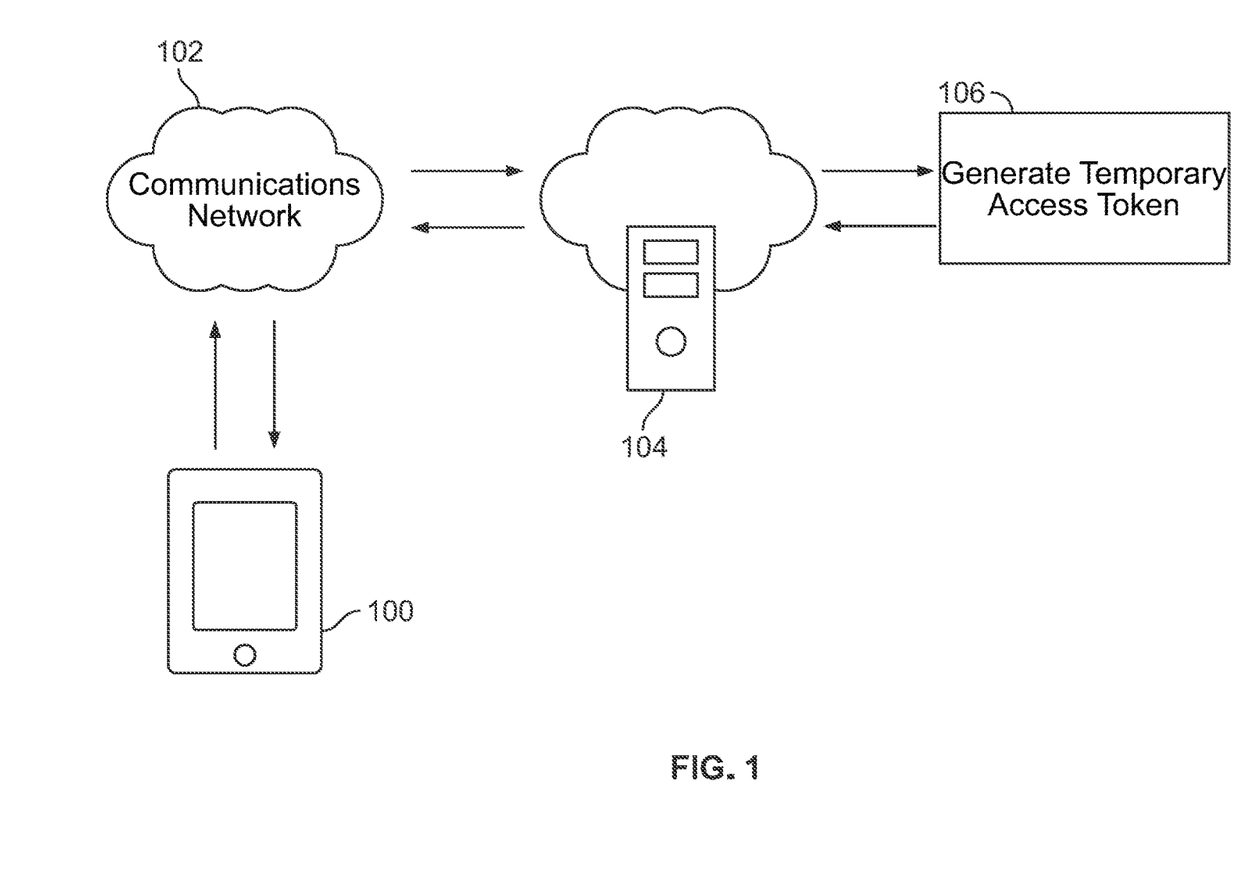
FIG. 1 shows an exemplary environment in which temporary access to an over-the-top content platform is granted, in accordance with some embodiments of the disclosure.

FIG. 1 shows an exemplary environment in which temporary access to an over-the-top content platform is granted, in accordance with some embodiments of the disclosure. A user requests temporary access to an over-the-top content platform at a mobile device 100. The user may initiate the request by, for example, providing a code at a website of the over-the-top content platform. The request is transmitted, via a communications network 102, to a server 104. The communications network 102 may be a local network and/or the internet and may include wired and/or wireless components. At the server 104, a temporary access token is generated 106. The temporary access token is assigned to the mobile device 100. For example, the token may be sent, via the communications network 102, to the mobile device 100. Access to the over-the-top content platform is granted via the temporary access token. For example, the mobile device 100 may send, via the communications network 102, the temporary access token to the over-the-top content platform provider. The over-the-top content platform provider may verify the token and grant the mobile device 100 access to the over-the-top content platform for the period of time defined by the token. Once the period of time defined by the token has expired, the mobile device's access to the over-the-top platform may be revoked.

Figure 2A:
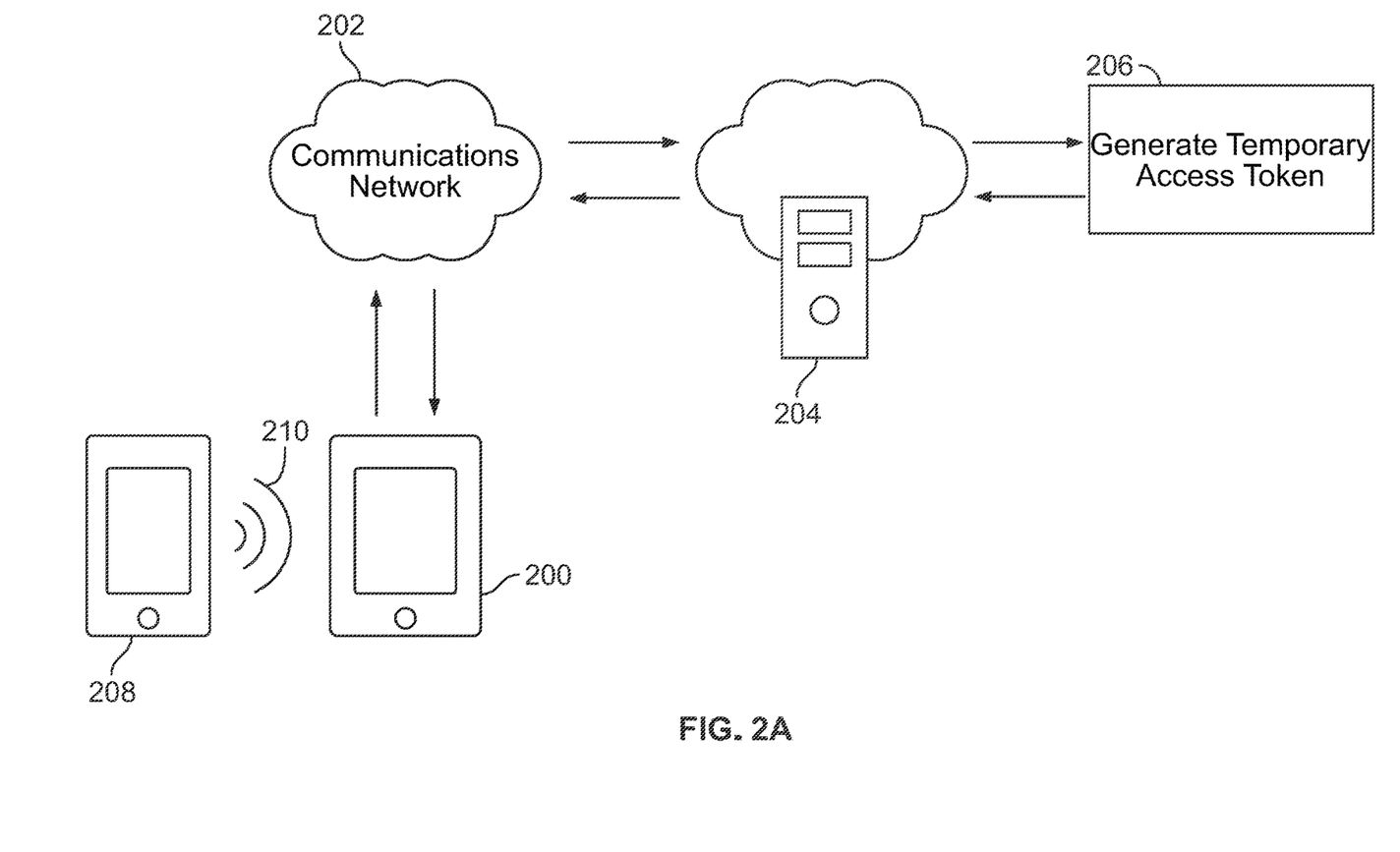
FIG. 2A shows another exemplary environment in which temporary access to an over-the-top content platform is granted, in accordance with some embodiments of the disclosure.

FIG. 2A shows another exemplary environment in which temporary access to an over-the-top content platform is granted, in accordance with some embodiments of the disclosure. An account holder initiates the request by selecting an option to enable temporary access to the over-the-top content platform at an app running on a first mobile device 208. The first mobile device 208 may transmit the request, for example, via Bluetooth, to a second mobile device 200. The request is received at the second mobile device 200 by an app running on the second mobile device. The request is transmitted from the second mobile device 200, via a communications network 202, to a server 204. Again, the communications network 202 may be a local network and/or the internet and may include wired and/or wireless components. At the server 204, a temporary access token is generated 206. The temporary access token is assigned to the second mobile device 200. For example, the token may be sent, via the communications network 202, to the second mobile device 200. Access to the over-the-top content platform is granted via the temporary access token. For example, the second mobile device 200 may send, via the communications network 202, the temporary access token to the over-the-top content platform provider. The over-the-top content platform provider may verify the token and grant the mobile device 200 access to the over-the-top content platform for the period of time defined by the token. Once the period of time defined by the token has expired, the mobile device's access to the over-the-top platform may be revoked.

Figure 2B:
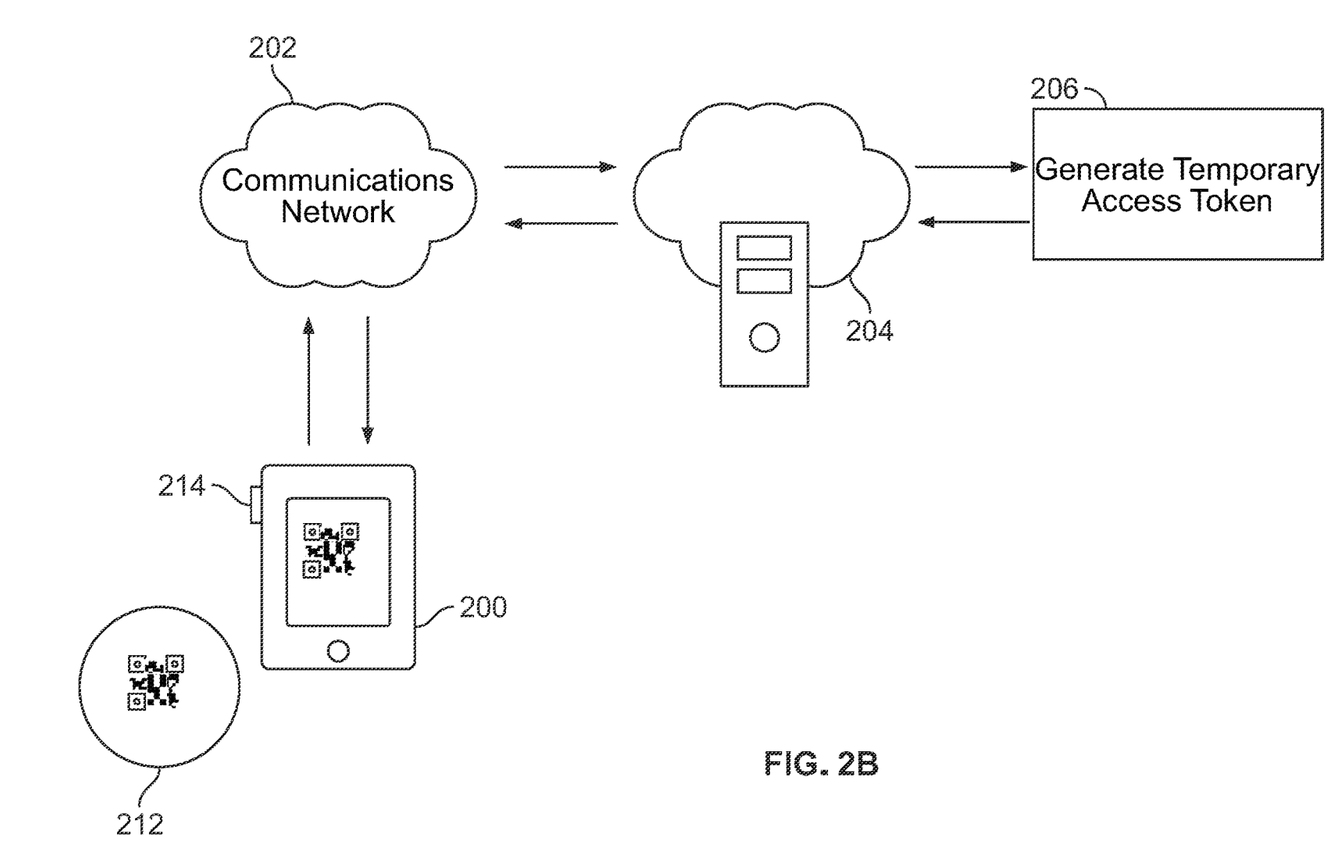
FIG. 2B shows another exemplary environment in which temporary access to an over-the-top content platform is granted, in accordance with some embodiments of the disclosure.

FIG. 2B shows another exemplary environment in which temporary access to an over-the-top content platform is granted, in accordance with some embodiments of the disclosure. A user requests temporary access to an over-the-top content platform at a mobile device 200. The user initiates the request by capturing a QR code 212 via a camera 214 of the mobile device 200. The QR code may comprise an internet link and a code for requesting temporary access to the over-the-top content platform. The request is transmitted, via a communications network 202, to a server 204. At the server 204, a temporary access token is generated 206. The temporary access token is assigned to the mobile device 200. For example, the token may be sent, via the communications network 202, to the mobile device 200. Access to the over-the-top content platform is granted via the temporary access token. For example, the mobile device 200 may send, via the communications network 202, the temporary access token to the over-the-top content platform provider. The over-the-top content platform provider may verify the token and grant the mobile device 200 access to the over-the-top content platform for the period of time defined by the token. Once the period of time defined by the token has expired, the mobile device's access to the over-the-top platform may be revoked.

Figure 3:
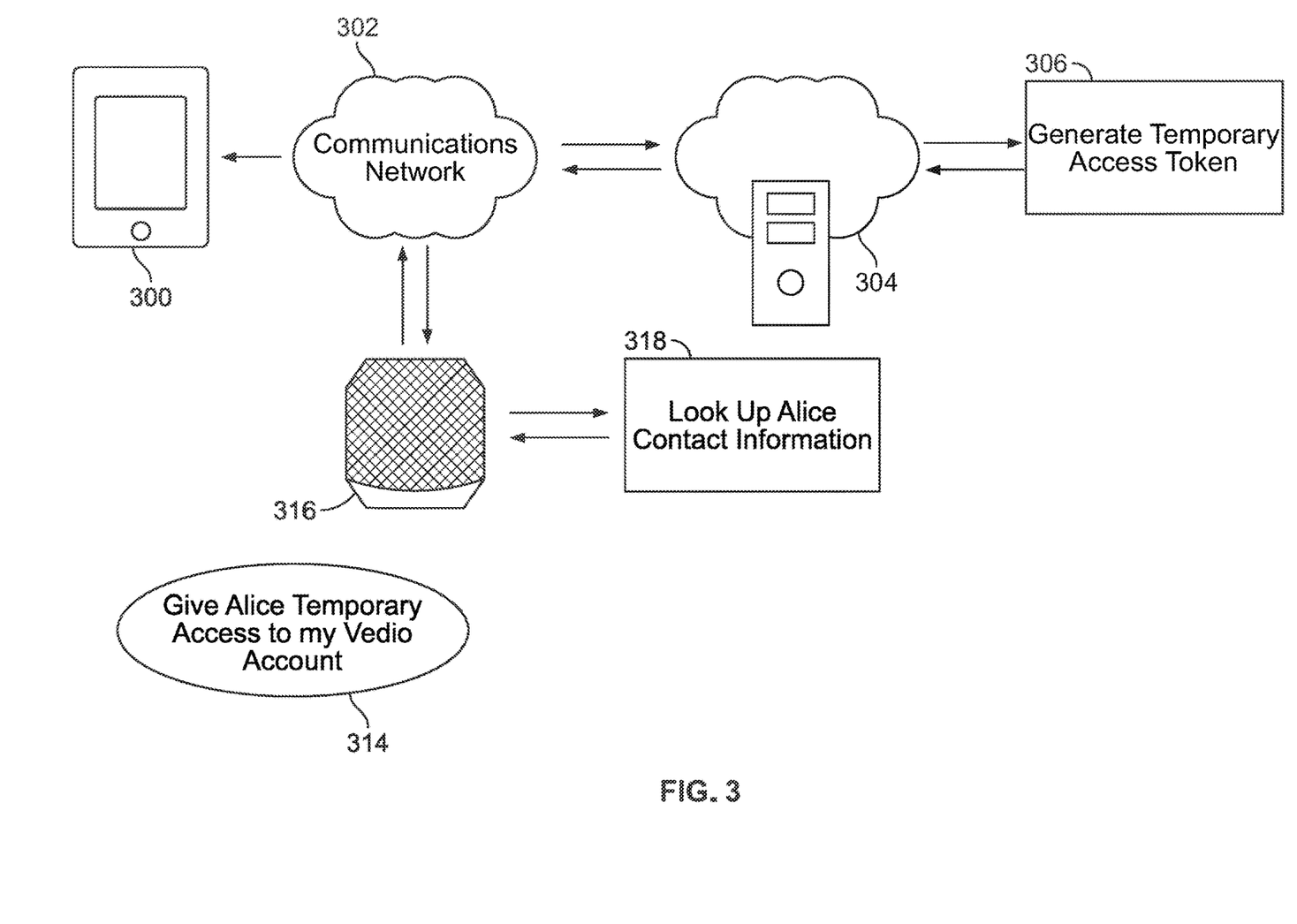
FIG. 3 shows another exemplary environment in which temporary access to an over-the-top content platform is granted, in accordance with some embodiments of the disclosure.

FIG. 3 shows another exemplary environment in which temporary access to an over-the-top content platform is granted, in accordance with some embodiments of the disclosure. A user requests temporary access to an over-the-top content platform at a smart speaker 316. The user initiates the request by issuing a command 314 to the smart speaker 316. In this example, the command is "Give Alice temporary access to my video account." The smart speaker looks up contact information about Alice. This contact information may be obtained, for example, at the smart speaker, at a device connected to the smart speaker, such as a smartphone connected via Bluetooth, and/or from a server remote to the smart speaker. The request and Alice's contact information are transmitted, via a communications network 302, to a server 304. Again, the communications network 302 may be a local network and/or the internet and may include wired and/or wireless components. At the server 304, a temporary access token is generated 306. The temporary access token is assigned to Alice's mobile device 300, utilizing Alice's contact information. For example, the token may be sent, via the communications network 302, to the mobile device 300. Access to the over-the-top content platform is granted via the temporary access token. For example, the mobile device 300 may send, via the communications network 302, the temporary access token to the over-the-top content platform provider. The over-the-top content platform provider may verify the token and grant the mobile device 300 access to the over-the-top content platform for the period of time defined by the token. Once the period of time defined by the token has expired, the mobile device's access to the over-the-top platform may be revoked.

Figure 4:
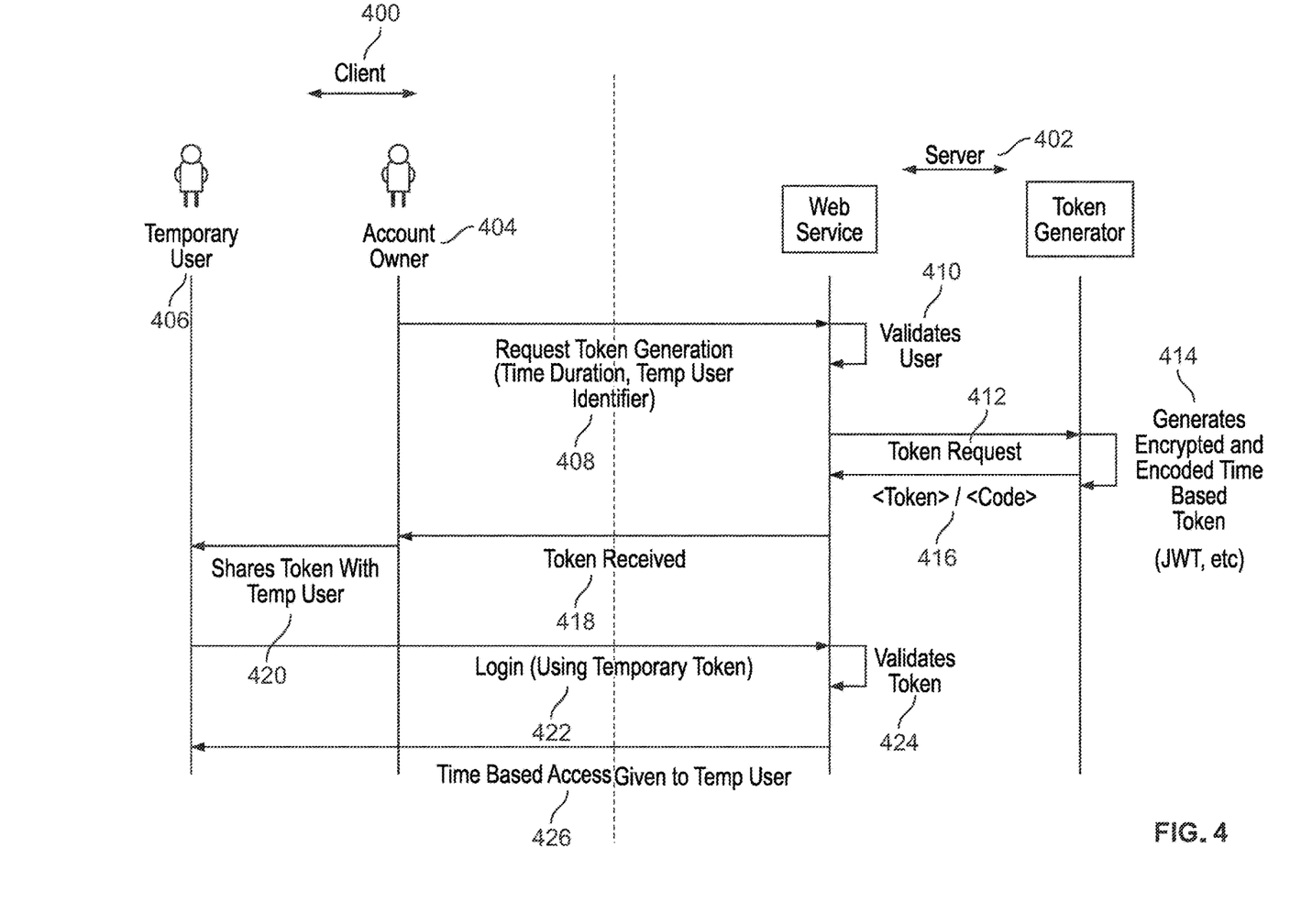
FIG. 4 is a diagram representing a data flow for granting temporary access to an over-the-top content platform, in accordance with some embodiments of the disclosure.

FIG. 4 is a diagram representing a data flow for granting temporary access to an over-the-top content platform, in accordance with some embodiments of the disclosure. At a client 400, such as a mobile device, an account owner 404 requests a token generation 408. The request includes the duration of temporary access for a temporary user 406 as well as an identifier for the temporary user 406. The request is sent from the client 400 to a web service of a server 402. The account owner 404 is validated 410. Following the validation of the account owner 404, a token request 412 is sent to a token generator of the server 402. At the token generator, a token is generated and encrypted 414. The token is sent 416 from the server 402 and is received 418 by the client 400. The token is shared 420 with the temporary user 406. The temporary user 406 uses the temporary token to log in 422 to the over-the-top content provider. The over-the-top content provider validates the token 424 and provides time-based access 426 to the temporary user 406.

Figure 5:
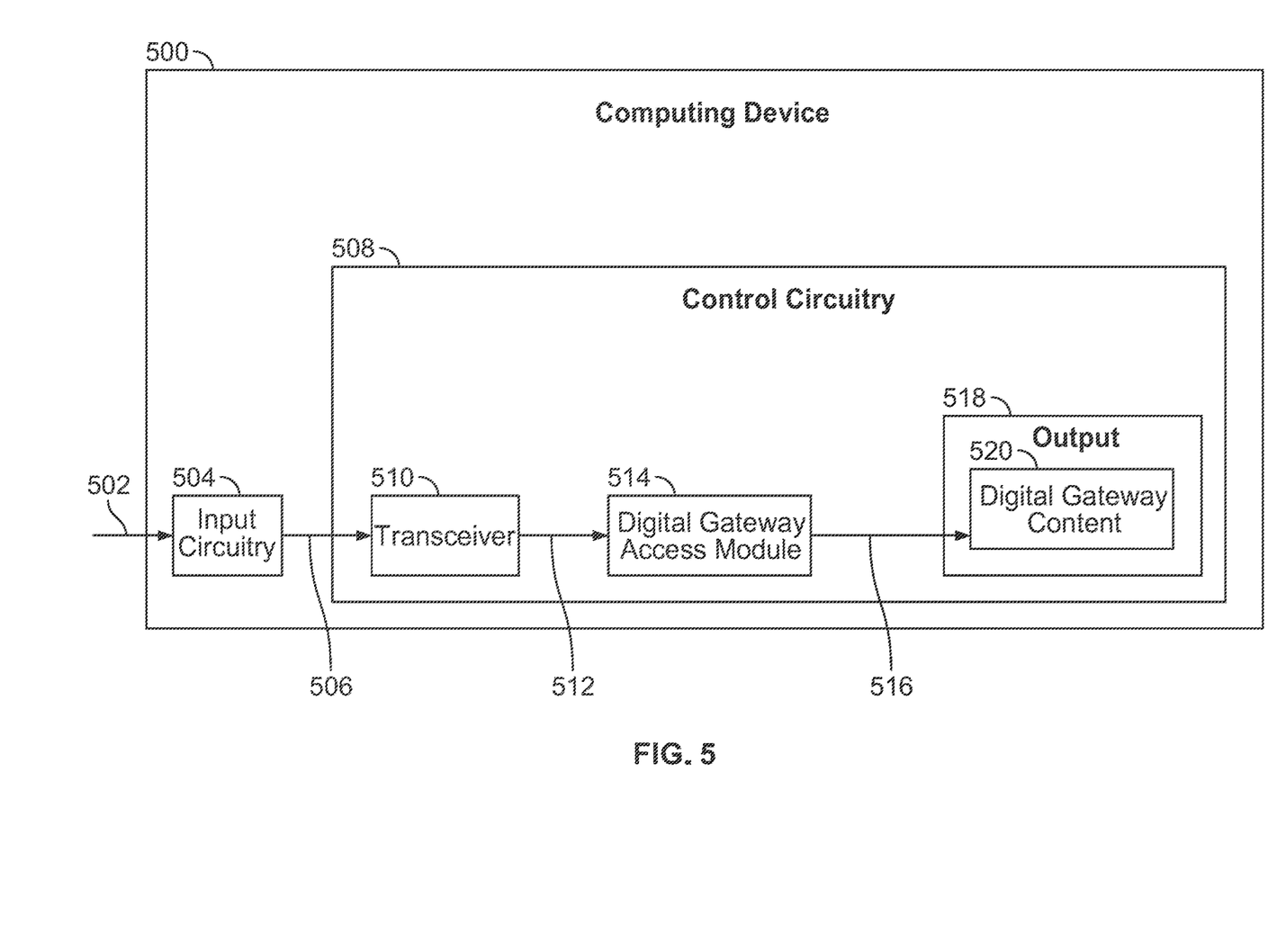
FIG. 5 is a block diagram representing components of a computing device and data flow therebetween for granting temporary access to an over-the-top content platform, in accordance with some embodiments of the disclosure.

FIG. 5 is a block diagram representing components of a computing device and data flow therebetween for granting temporary access to an over-the-top content platform, in accordance with some embodiments of the disclosure. Computing device 500 (e.g., a mobile device 100, 200 as discussed in connection with FIGS. 1-2) comprises input circuitry 504, control circuitry 508 and an output module 518. Control circuitry 508 may be based on any suitable processing circuitry (not shown) and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

A user provides an input 502 that is received by the input circuitry 504. The input circuitry 504 is configured to receive a user input related to a computing device. For example, this may be via a touchscreen, keyboard, mouse, microphone and/or infra-red controller of the computing device 500. The input circuitry 504 transmits 506 the user input to the control circuitry 508.

The control circuitry 508 comprises a transceiver 510, a digital gateway access module 514 and an output module 518. The user input is transmitted to the transceiver 510. At the transceiver 510, a request for temporary access a digital gateway (such as an over-the-top content platform), based on the user input 502, is transmitted via a communications network to a server. The communications network may comprise wired and/or wireless means, for example, the internet and/or a Wi-Fi network. At the server a temporary access token is generated and is transmitted back to the computing device, via the transceiver 510. The temporary access token is transmitted 512 to the digital gateway access module 514. The digital access module 514 transmits the token to the over-the-top content platform. Upon verification, the over-the-top content platform grants temporary access to the computing device 500. This is transmitted 516 to the output module 518. The output module 518 displays content 520 from the digital gateway to the user via a display of the computing device.

Figure 6:
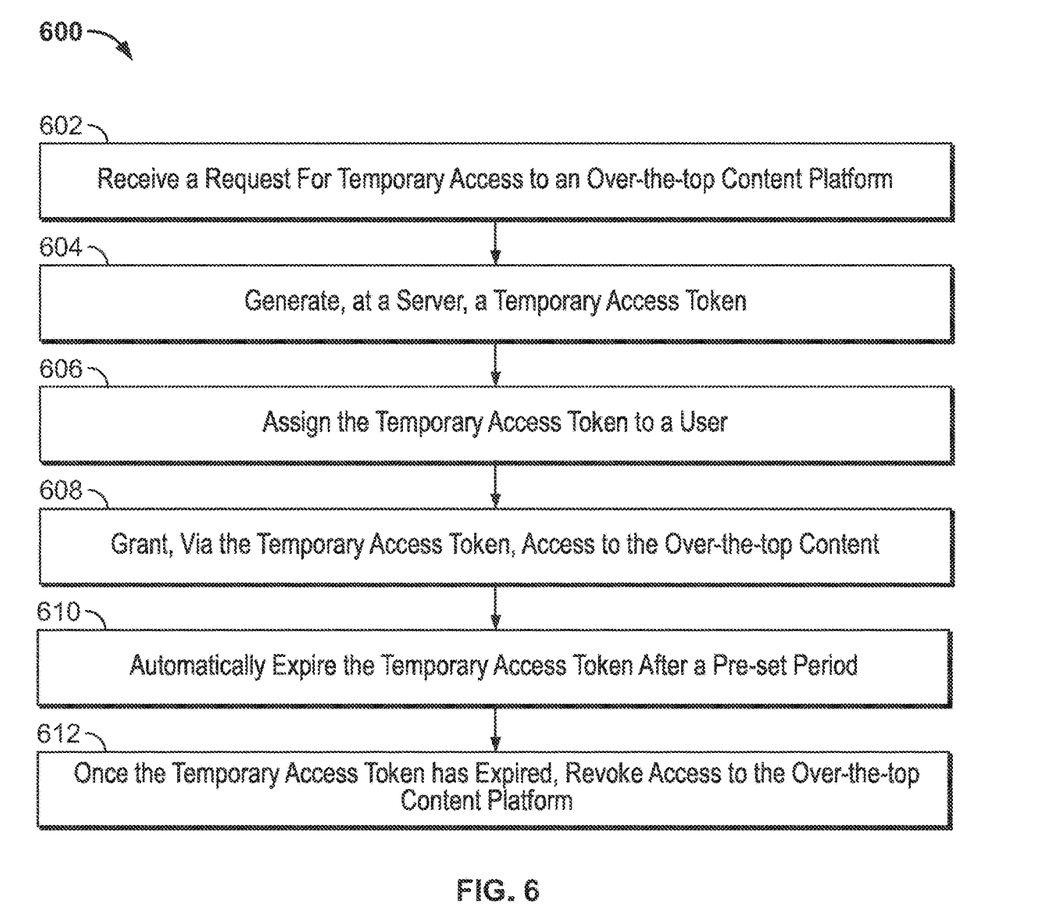
FIG. 6 is a flowchart representing a process for granting temporary access to an over-the-top content platform, in accordance with some embodiments of the disclosure.

FIG. 6 is a flowchart representing a process for granting temporary access to an over-the-top content platform, in accordance with some embodiments of the disclosure. Process 600 may be implemented on any aforementioned computing device 100, 200. In addition, one or more actions of the process 600 may be incorporated into or combined with one or more actions of any other process or embodiments described herein.

At 602, a request for temporary access to an over-the-top content platform is received. At 604, a temporary access token is generated at a server. At 606, the temporary access token is assigned to a user. At 608, access to the over-the-top content platform is granted via the temporary access token. At 610, the temporary access token automatically expires after a pre-set period. At 612, access to the over-the-top content platform is revoked once the temporary access token has expired.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   while a first computing device is logged into an over-the-top (OTT) content provider with a user account and is playing a video content item from the OTT content provider:
      receiving a request to access a portion of the video content item at a second computing device not logged into the OTT content provider;
      in response to the receiving the request, generating a link unique to the user account;
      detecting an interaction with the link at the second computing device;
      based at least in part on the detecting the interaction with the link at the second computing device, granting the second computing device temporary access to the OTT content provider, without the second computing device logging into the OTT content provider, via a token, wherein the token defines a time period;
      causing the portion of the video content item to be played at the second computing device based at least in part on the granted temporary access and without the second computing device logging into to the service of the content provider; and
      revoking the temporary access to the link when the time period expires.

2. The method of claim 1, wherein:
   an input to temporarily stop playback of the video content item is received before the request to access the portion of the video content item is received; and
   the link is generated based on the temporary stop position of the video content item.

3. The method of claim 1, wherein the method further comprises transmitting the generated link from a server to the second computing device.

4. The method of claim 1, wherein:
generating the link further comprises generating a quick response code at the first computing device; and
detecting the interaction further comprises scanning the quick response code with the second computing device.

5. The method of claim 1, wherein the temporary access expires after the video content item is accessed a pre-defined number of times.

6. The method of claim 1, wherein granting temporary access to the OTT content provider further comprises verifying an identify of a user of the second computing device before granting temporary access to the service.

7. The method of claim 1, wherein:
the service of the content provider further comprises a plurality of chatrooms;
granting access to the OTT content provider further comprises granting access to the plurality of chatrooms via the second computing device; and
revoking the temporary access further comprises removing access to the plurality of chatrooms.

8. The method of claim 7, further comprising:
putting the first computing device and the second computing device in a first chatroom of the plurality of chatrooms; and
synchronizing playback, of the video content item, between the first computing device and the second computing device.

9. The method of claim 1, wherein:
the method further comprises:
accessing a website associated with the OTT content provider at a third computing device;
receiving a temporary password at the website, wherein the temporary password is separate from a password used to access the OTT content provider; and
detecting an interaction with the link at the second computing device further comprises receiving user input associated with inputting the temporary password.

10. The method of claim 1, wherein granting temporary access to the OTT content provider further comprises granting temporary access to a category of content items available via the OTT content provider.

11. A system comprising:
input circuitry configured to:
while a first computing device is logged into to an over-the-top (OTT) content provider with a user account and is playing a video content item from the OTT content provider:
receive a request to access a portion of the video content item at a second computing device not logged into the OTT content provider;
control circuitry configured to:
in response to the receiving the request,
generate a link unique to the user account;
detect an interaction with the link at the second computing device;
based at least in part on the detecting the interaction with the link at the second computing device, grant the second computing device temporary access to the OTT content provider, without the second computing device logging into the OTT content provider, via a token, wherein the token defines a time period;
cause the portion of the video content item to be played at the second computing device based at least in part on the granted temporary access and without the second computing device logging into to the service of the content provider; and
evoke the temporary access to the link when the time period expires.

12. The system of claim 11, wherein:
the input control circuitry is further configured to receive an input to temporarily stop playback of the content item before the request to access the portion of the video content item is received; and
the control circuitry is configured to generate the link by generating the link based on the temporary stop position of the video content item.

13. The system of claim 11, wherein the control circuitry is further configured to transmit the generated link from a server to the second computing device.

14. The system of claim 11, wherein:
the control circuitry is configured to generate the link by generating a quick response code at the first computing device; and
the control circuitry is configured to detect the interaction by detecting the interaction via scanning the quick response code with the second computing device.

15. The system of claim 11, wherein the control circuitry is configured to revoke the temporary access by expiring the temporary access after the portion of the video content item is accessed a pre-defined number of times.

16. The system of claim 11, wherein the control circuitry is configured to grant temporary access to the OTT content provider by verifying an identify of a user of the second computing device before granting temporary access to the service.

17. The system of claim 11, wherein:
the OTT content provider further comprises a plurality of chatrooms;
the control circuitry is further configured to grant access to the plurality of chatrooms via the second computing device; and
the control circuitry is further configured to remove access to the plurality of chatrooms when expiring the temporary access.

18. The system of claim 17, wherein the control circuitry is further configured to:
put the first computing device and the second computing device in a first chatroom of the plurality of chatrooms; and
synchronize playback, of the video content item, between the first computing device and the second computing device.

19. The system of claim 11, wherein:
the control circuitry is further configured to:
access a website associated with the OTT content provider at a third computing device;
receive a temporary password at the website, wherein the temporary password is separate from a password used to access the OTT content provider; and
the control circuitry is configured to detect an interaction with the link at the second computing device by receiving user input associated with inputting the temporary password.

20. The system of claim 11, wherein the control circuitry is configured to grant temporary access by granting temporary access to a category of content items available via the OTT content provider.

* * * * *

UNITED STATES PATENT AND TRADEMARK OFFICE
CERTIFICATE OF CORRECTION

PATENT NO.         : 12,348,803 B2
APPLICATION NO.    : 18/098494
DATED              : July 1, 2025
INVENTOR(S)        : Vaibhav Gupta et al.

Page 1 of 1

It is certified that error appears in the above-identified patent and that said Letters Patent is hereby corrected as shown below:

In the Claims

Claim 11, Column 10, Line 3, the word "evoke" should be "revoke."

Signed and Sealed this
Twelfth Day of August, 2025

Coke Morgan Stewart
*Acting Director of the United States Patent and Trademark Office*